(12) United States Patent
Servies et al.

(10) Patent No.: US 12,011,084 B2
(45) Date of Patent: *Jun. 18, 2024

(54) CABINET ASSEMBLY

(71) Applicant: Home Depot Product Authority, LLC, Atlanta, GA (US)

(72) Inventors: Nicholas Servies, Kennesaw, GA (US); Nicholas Jackson, Marrietta, GA (US); Lauren Perrine, Atlanta, GA (US)

(73) Assignee: Home Depot Product Authority, LLC, Atlanta, GA (US)

( * ) Notice: Subject to any disclaimer, the term of this patent is extended or adjusted under 35 U.S.C. 154(b) by 540 days.

This patent is subject to a terminal disclaimer.

(21) Appl. No.: 17/228,022

(22) Filed: Apr. 12, 2021

(65) Prior Publication Data

US 2021/0307506 A1 Oct. 7, 2021

Related U.S. Application Data

(63) Continuation of application No. 16/839,815, filed on Apr. 3, 2020, now Pat. No. 10,973,316.

(51) Int. Cl.
*A47B 43/00* (2006.01)
*A47B 47/00* (2006.01)
*F16B 12/24* (2006.01)

(52) U.S. Cl.
CPC .............. *A47B 43/00* (2013.01); *A47B 47/00* (2013.01); *F16B 12/24* (2013.01)

(58) Field of Classification Search
CPC ..... F16B 5/0036; F16B 5/0044; F16B 5/0048
See application file for complete search history.

(56) References Cited

U.S. PATENT DOCUMENTS

| 695,677 | A | | 3/1902 | Faris | |
|---|---|---|---|---|---|
| 1,106,569 | A | * | 8/1914 | Kessler | A47B 46/005 16/350 |
| 1,571,601 | A | | 2/1926 | Richards | |
| 2,355,653 | A | * | 8/1944 | Joyce | A47B 23/04 248/447 |
| 3,675,293 | A | | 7/1972 | Hajduk | |

(Continued)

FOREIGN PATENT DOCUMENTS

| DE | 2657386 A2 * | 7/1991 | ............ F16B 5/0048 |
|---|---|---|---|
| DE | 102005002800 A1 * | 7/2006 | .............. F24C 15/30 |

OTHER PUBLICATIONS

Office Action from Canadian application No. 3,108,584, dated Dec. 19, 2023, 3 pp.

*Primary Examiner* — Matthew R McMahon
(74) *Attorney, Agent, or Firm* — Greenberg Traurig, LLP

(57) ABSTRACT

A cabinet assembly and cabinet assembly kit include two side panels and a rear panel coupled by hinge assemblies. Each hinge assembly includes a first bracket, a second bracket, and a linkage. The first and second brackets each include a key that alternate to create a key channel when the one of the side panels is positioned at a generally right angle relative to the rear panel. Each hinge assembly permits the cabinet assembly to be configured in a folded configuration in which the side panels are parallel with the rear panel. A locking bracket includes a locking member sized and shaped to be inserted into the key channel. The locking bracket locks the side panel into a substantially right angle relative to the rear panel when the locking member is inserted into the key channel.

20 Claims, 12 Drawing Sheets

(56) References Cited

U.S. PATENT DOCUMENTS

| | | | | |
|---|---|---|---|---|
| 3,749,465 A | * | 7/1973 | Newcomer | F16B 12/22 312/263 |
| 3,836,217 A | | 9/1974 | Shina | |
| 3,926,529 A | * | 12/1975 | Brooks | F16B 12/24 52/285.4 |
| 4,099,809 A | * | 7/1978 | Leotta | A47B 43/00 312/258 |
| 4,907,384 A | | 3/1990 | Underwood | |
| 5,076,736 A | | 12/1991 | Grewe et al. | |
| 5,531,539 A | | 7/1996 | Crawford | |
| 5,570,865 A | | 11/1996 | Godfrey | |
| 5,709,500 A | * | 1/1998 | Mizelle | A47C 4/02 403/3 |
| 5,738,230 A | * | 4/1998 | Goldstein | A47F 5/10 211/186 |
| 5,984,566 A | * | 11/1999 | Blaha | A47B 87/002 403/220 |
| 6,023,899 A | | 2/2000 | Mecozzi | |
| 6,036,398 A | | 3/2000 | Theodorou | |
| 6,085,477 A | | 7/2000 | Hiese et al. | |
| 6,200,062 B1 | | 3/2001 | You | |
| 6,715,764 B2 | | 4/2004 | Delavalle | |
| 6,769,727 B2 | | 8/2004 | Delavalle et al. | |
| 6,848,758 B1 | * | 2/2005 | Yeh | F16B 12/24 312/258 |
| 7,313,893 B2 | | 1/2008 | Voegele, Jr. | |
| 7,788,869 B2 | | 9/2010 | Voegele, Jr. | |
| 7,802,408 B2 | | 9/2010 | Asbury | |
| 8,015,931 B2 | * | 9/2011 | Lin | A47B 43/00 108/115 |
| 8,147,012 B2 | | 4/2012 | Green | |
| 8,641,155 B2 | * | 2/2014 | Lee | F16B 5/0052 312/110 |
| 8,733,851 B2 | | 5/2014 | Lee | |
| 9,016,730 B2 | | 4/2015 | Cameron et al. | |
| 9,051,946 B2 | * | 6/2015 | Cameron | F16B 5/0044 |
| 9,217,450 B2 | | 12/2015 | Pettigrew et al. | |
| 9,370,898 B2 | | 6/2016 | Pettigrew et al. | |
| 9,380,877 B2 | | 7/2016 | Brandtner et al. | |
| 9,458,867 B2 | | 10/2016 | Maunder | |
| 9,562,356 B2 | | 2/2017 | Israeli et al. | |
| 9,840,841 B2 | | 12/2017 | Gosling | |
| 9,856,644 B2 | | 1/2018 | Gosling et al. | |
| 9,890,875 B2 | | 2/2018 | Hajbi | |
| 10,301,821 B2 | | 5/2019 | Gosling | |
| 2005/0067927 A1 | * | 3/2005 | Ho | A47B 43/00 312/258 |
| 2008/0053026 A1 | | 3/2008 | Voegele, Jr. | |
| 2010/0189492 A1 | * | 7/2010 | Green | F16B 12/22 312/352 |
| 2011/0017692 A1 | * | 1/2011 | Marietta | A47B 43/00 211/195 |
| 2012/0051833 A1 | | 3/2012 | Israeli et al. | |
| 2012/0321378 A1 | * | 12/2012 | Velez, Jr. | F16B 12/20 403/300 |
| 2014/0327350 A1 | * | 11/2014 | Tassin | A47B 46/00 312/249.7 |
| 2016/0348361 A1 | | 12/2016 | Gosling et al. | |
| 2017/0107722 A1 | | 4/2017 | Israeli et al. | |
| 2018/0297746 A1 | * | 10/2018 | Sneddon | B65D 21/0212 |
| 2021/0060448 A1 | * | 3/2021 | Sullivan | A63H 33/008 |

* cited by examiner

CABINET ASSEMBLY

CROSS-REFERENCE TO RELATED APPLICATION

This application is a continuation of U.S. patent application Ser. No. 16/839,815, filed Apr. 3, 2020, issued as U.S. Pat. No. 10,973,316, and titled "CABINET ASSEMBLY," the entire contents of which are hereby incorporated by reference in their entirety.

BACKGROUND

Furniture such as cabinets is often manufactured in individual components that are then provided to a purchaser for assembly. The assembly of these cabinets can be cumbersome and time consuming. In some instances, assembling cabinets can require multiple people to assemble. Improved cabinet assemblies that are ready-to-assemble are desirable.

SUMMARY

A cabinet assembly is disclosed. The cabinet assembly includes two side panels and a rear panel. Hinge assemblies couple the side panels to the rear panel. Each hinge assembly includes a first bracket mounted on an interior face of one of the side panels. The first bracket has a first key and a first pivot head. A second bracket is mounted on an interior face of the rear panel. The second bracket has a second key and a second pivot head. The first key alternates with the second key to create a key channel when the one of the side panels is positioned at a generally right angle relative to the rear panel. A linkage has a first generally round aperture and a second generally oblong aperture. The first pivot head is positioned within the first aperture to thereby couple the linkage, the first bracket, and the one of the side panels. The second pivot head is positioned within the second aperture to thereby couple the linkage, the second bracket, and the rear panel. The second pivot head is movable laterally within the second aperture. The hinge assemblies permit the cabinet assembly to be configured in a folded configuration in which the side panels are parallel with the rear panel while also coupled with the rear panel. A locking bracket has an outer edge and a locking member extending away from the outer edge. The locking member is sized and shaped to be inserted into the key channel. The locking bracket locks the side panel into a substantially right angle relative to the rear panel when the locking member is inserted into the key channel.

In some embodiments, the cabinet assembly includes first bores proximate a rear end of an edge of the side panel and second bores proximate opposing ends of an edge of the rear panel. In such embodiments, the first pivot heads are parts of first pins that are insertable into one of the first bores, and the second pivot heads are parts of second pins that are insertable into the second bores.

A method of assembling a cabinet assembly is also disclosed. The method includes rotating a first side panel of a cabinet sub-assembly from a first folded position to a first installation position. The cabinet sub-assembly includes a rear panel coupled to the first side panel via a first hinge assembly and a second side panel coupled to the rear panel via a second hinge assembly. The first hinge assembly defines a first channel when the first side panel is in the first installation position. The first side panel is generally parallel to the rear panel in the first folded position. The method includes rotating the second side panel from a second folded position to a second installation position. The second hinge assembly defines a second channel when the second side panel is in the second installation position. The second side panel is generally parallel to the rear panel in the second folded position. The method includes inserting a first locking bracket into the first channel. The first locking bracket locks the first side panel into a substantially right angle relative to the rear panel when the second locking member is inserted into the first channel. The method further includes inserting a second locking bracket into the second channel. The second locking bracket locks the second side panel into a substantially right angle relative to the rear panel when the second locking member is inserted into the first channel.

In some embodiments, a bottom and toe-kick subassembly are inserted into slots in the side panels and a face frame is secured to the side panels with brackets. Drawer slides are installed on the side panels and a drawer is inserted.

In some embodiments, the method can include securing the side panels to the rear panel by, for example, screwing the side panels to the rear panel. In some embodiments, fastening the side panels and the rear panels may provide additional security to prevent unintentional disassembly of the cabinet assembly.

A cabinet assembly kit is also disclosed. The kit includes a cabinet assembly. The cabinet assembly includes two side panels and a rear panel. Hinge assemblies couple the side panels to the rear panel. Each hinge assembly includes a first bracket mounted on an interior face of one of the side panels. The first bracket has a first key and a first pivot head. A second bracket is mounted on an interior face of the rear panel. The second bracket has a second key and a second pivot head. The first key alternates with the second key to create a key channel when the one of the side panels is positioned at a generally right angle relative to the rear panel. A linkage has a first generally round aperture and a second generally oblong aperture. The first pivot head is positioned within the first aperture to thereby couple the linkage, the first bracket, and the one of the side panels. The second pivot head is positioned within the second aperture to thereby couple the linkage, the second bracket, and the rear panel. The second pivot head is movable laterally within the second aperture. The hinge assemblies permit the cabinet assembly to be configured in a folded configuration in which the side panels are parallel with the rear panel while also coupled with the rear panel. A locking bracket has an outer edge and a locking member extending away from the outer edge. The locking member is sized and shaped to be inserted into the key channel. The locking bracket locks the side panel into a substantially right angle relative to the rear panel when the locking member is inserted into the key channel.

In some embodiments, the cabinet assembly includes first bores proximate a rear end of an edge of the side panel and second bores proximate opposing ends of an edge of the rear panel.

BRIEF DESCRIPTION OF THE DRAWINGS

References are made to the accompanying drawings that form a part of this disclosure and illustrate embodiments in which the systems and methods described in this Specification can be practiced.

Like reference numbers represent like parts throughout.

DETAILED DESCRIPTION

Furniture assembly, such as cabinets or the like, can be difficult. For example, different pieces of a cabinet may be shipped in pieces, including various assembly parts. That is, a cabinet assembly typically may be sold in a box (or boxes) including the various assembly parts (e.g., fasteners, etc.) and cabinet components (e.g., rear panel, side panels, front panel, etc.). The assembly parts and cabinet components may be cumbersome for a single individual to assemble. As a result, multiple assemblers may be used to assemble the cabinet or, alternatively, the process may be time consuming from beginning the assembly to completion.

Various embodiments provide for improved cabinet assemblies that include one or more sub-assemblies including preassembled components. For example, a rear panel and one or more side panels may come interlocked with hinged corners that can simply be rearranged and locked into an assembled configuration. Other components such as the front panel can be attached to the side panels via a similar locking manner as the side panels and the rear panel. As a result, assembly can be simplified and relatively faster than prior cabinets. In some embodiments, the cabinet assembly may be simplified in a manner that a single individual can more easily assemble the cabinet.

As used herein, preassembled components means one or more components that are assembled (at least in part) during manufacturing and prior to packaging of the cabinet assembly.

The various cabinet assemblies described herein are generally representative of a freestanding cabinet assembly. In some embodiments, the cabinet assembly can be referred to as a lower cabinet or the like. That is, the cabinet assembly can be intended for use on a solid surface (e.g., the floor). It is to be appreciated that the cabinet assembly can alternatively be hung from a wall (i.e., elevated above the floor) in accordance with the principles described herein. In such embodiments, the cabinet assembly can be referred to as an upper cabinet or the like.

Figure 1B:
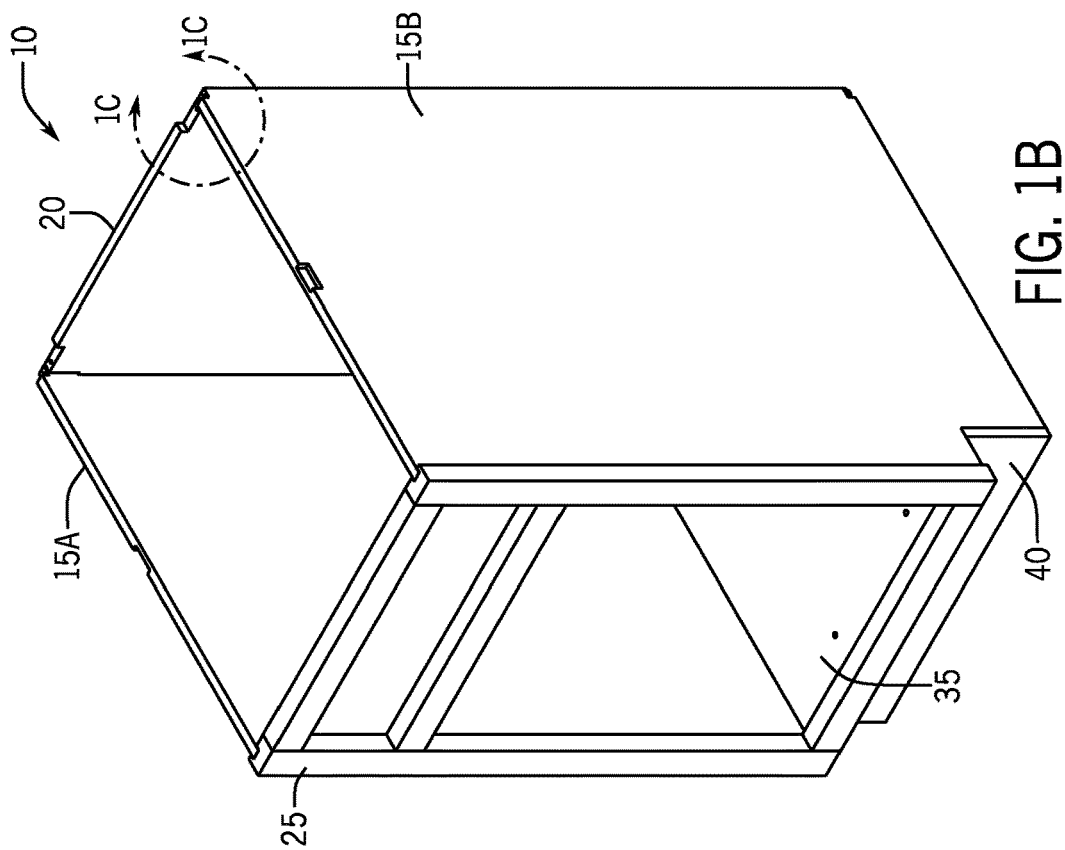
FIG. 1B is a perspective view of a cabinet assembly without a drawer and a cabinet door, according to various embodiments.
Figure 1A:
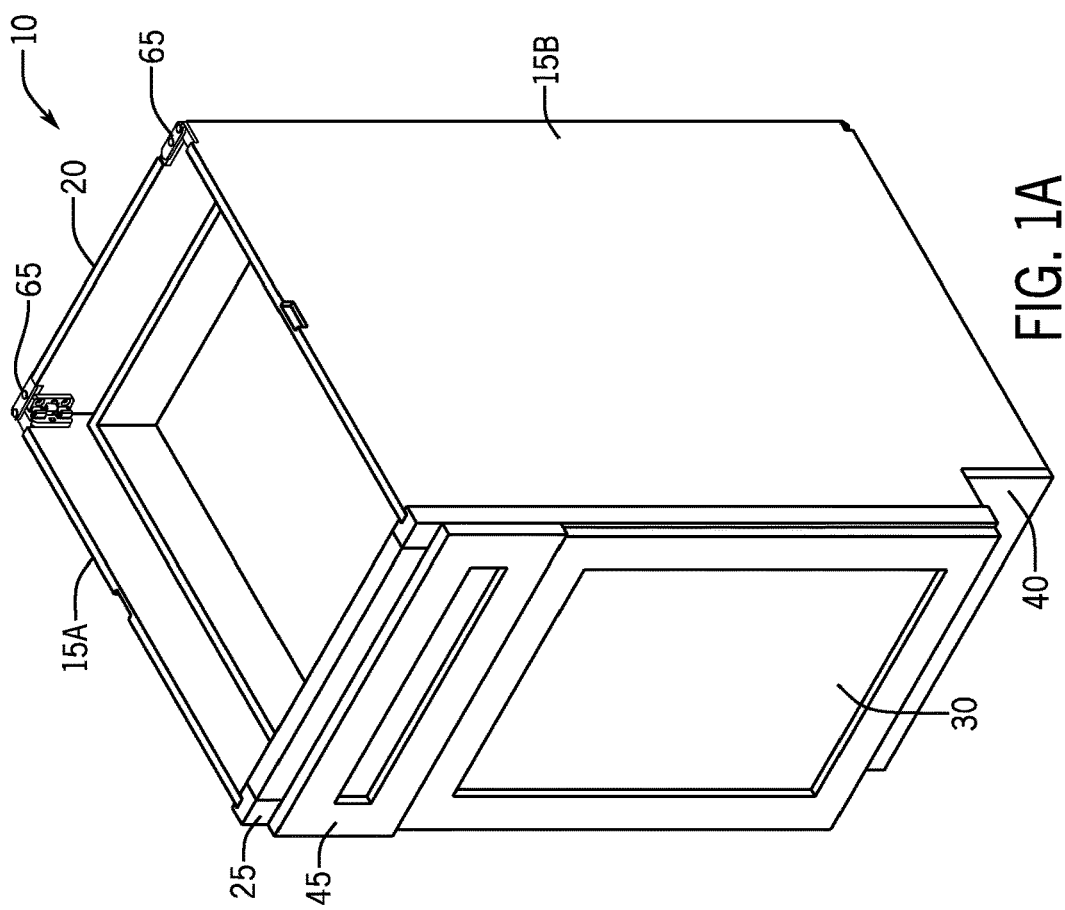
FIG. 1A is a perspective view of a cabinet assembly including a drawer and a cabinet door, according to various embodiments.
Figure 1C:
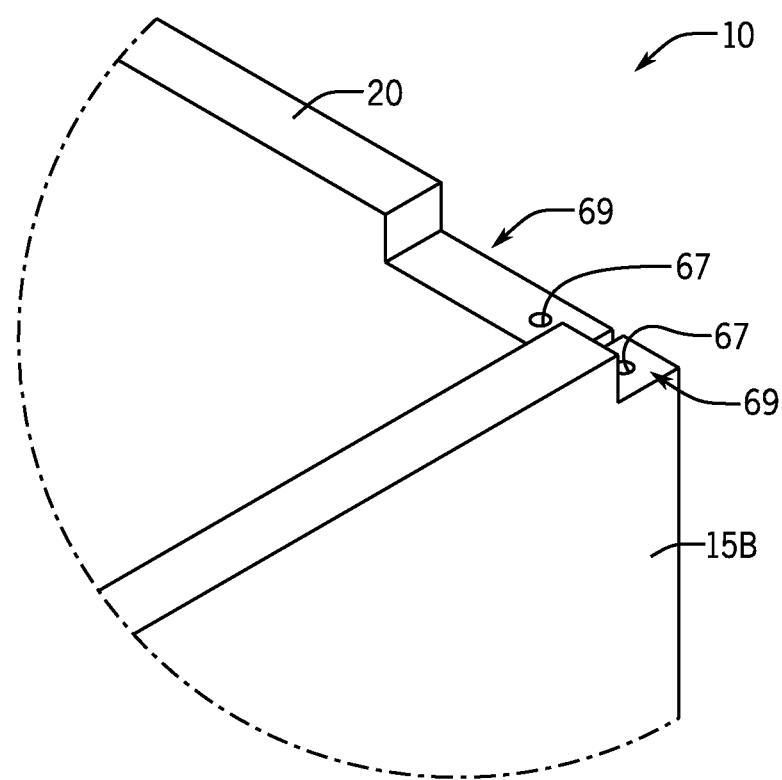
FIG. 1C is a zoomed view of a corner of a cabinet assembly, according to various embodiments.

FIGS. 1A-1C show a cabinet assembly 10, according to various embodiments. The cabinet assembly 10 can generally include a variety of sizes and shapes (e.g., rectangular, square, or the like). The cabinet assembly 10 may be referred to as a lower cabinet assembly or the like and may generally be representative of a cabinet assembly for installation on a solid surface (e.g., the floor). The size and geometry of the cabinet assembly 10 is not intended to be limiting and can vary. Materials for the cabinet assembly 10 can vary as well. In some embodiments, the various components (discussed in additional detail below) may be made from wood, medium-density fibreboard (MDF), or the like. The materials for the cabinet assembly 10 are not intended to be limiting and can vary.

General reference will be made to FIGS. 1A-1C, unless specifically noted otherwise.

The cabinet assembly 10 of the illustrated embodiment includes two side panels 15A, 15B; a rear panel 20; a face frame 25; a cabinet door 30; a bottom 35 (FIG. 1B); a toe-kick 40; and a drawer 45.

The side panels 15A, 15B and the rear panel 20 are joined by hinge assemblies 65. In the illustrated embodiment, there are two visible hinge assemblies 65 (on each rear upper corner of the cabinet assembly 10). There may be two additional hinge assemblies 65 on each rear lower corner of the cabinet assembly 10. The hinge assemblies 65 are secured to interior faces of each of the side panels 15A, 15B and the rear panel 20. The hinge assemblies 65 will be discussed in additional detail in accordance with FIGS. 3A-3E below.

Although embodiments may be described herein as having hinge assemblies 65 coupling the side panels 15A, 15B to the rear panel 20, with the face frame 25 being subsequently affixed to the side panels 15A, 15B, it should be appreciated that any two or more sides of the cabinet assembly 10 could be coupled via hinge assemblies 65.

In some embodiments, the cabinet assembly 10 can also include a counter surface (not shown). It is to be appreciated that the counter surface can be separate from the cabinet assembly 10 and installed separately from the cabinet assembly 10. In some embodiments, the cabinet assembly 10 can be part of a cabinet assembly kit (shown and described in additional detail in accordance with FIG. 6 below).

FIG. 1C shows a partial view of a corner of the cabinet assembly 10, according to various embodiments. As illustrated in FIG. 1C, with the hinge assemblies 65 removed from the rear upper corners of the cabinet assembly 10, bores 67 may be visible in the side panel 15B and the rear panel 20. The bores 67 may similarly be present in the opposite rear upper corner of the cabinet assembly 10 on the side panel 15A and the opposite end of the rear panel 20. In other embodiments, bores 67 may not be included.

In some embodiments bores 67 can receive pins (FIGS. 3A-3C) that provide pivot heads for the hinge assemblies 65. In other embodiments, however, the pivot heads (FIGS. 3A-3C) may be integral with the hinge assemblies 65, in which case the bores 67 are not needed in the cabinet assembly 10. In the illustrated embodiment, cutouts 69 are formed in the side panel 15B and rear panel 20 so that the hinge assembly 65 sits flush with a top surface of the cabinet assembly 10. In some embodiments, the cutouts 69 enable the hinge assemblies 65 to sit relatively lower than the top surface of the cabinet assembly 10. In some embodiments, the cutouts 69 may not be present on the side panel 15B or the rear panel 20. It is to be appreciated that, if present, the cutouts 69 would be present on both the side panel 15B and the rear panel 20 to align the different portions of the hinge assembly 65.

Figure 2:
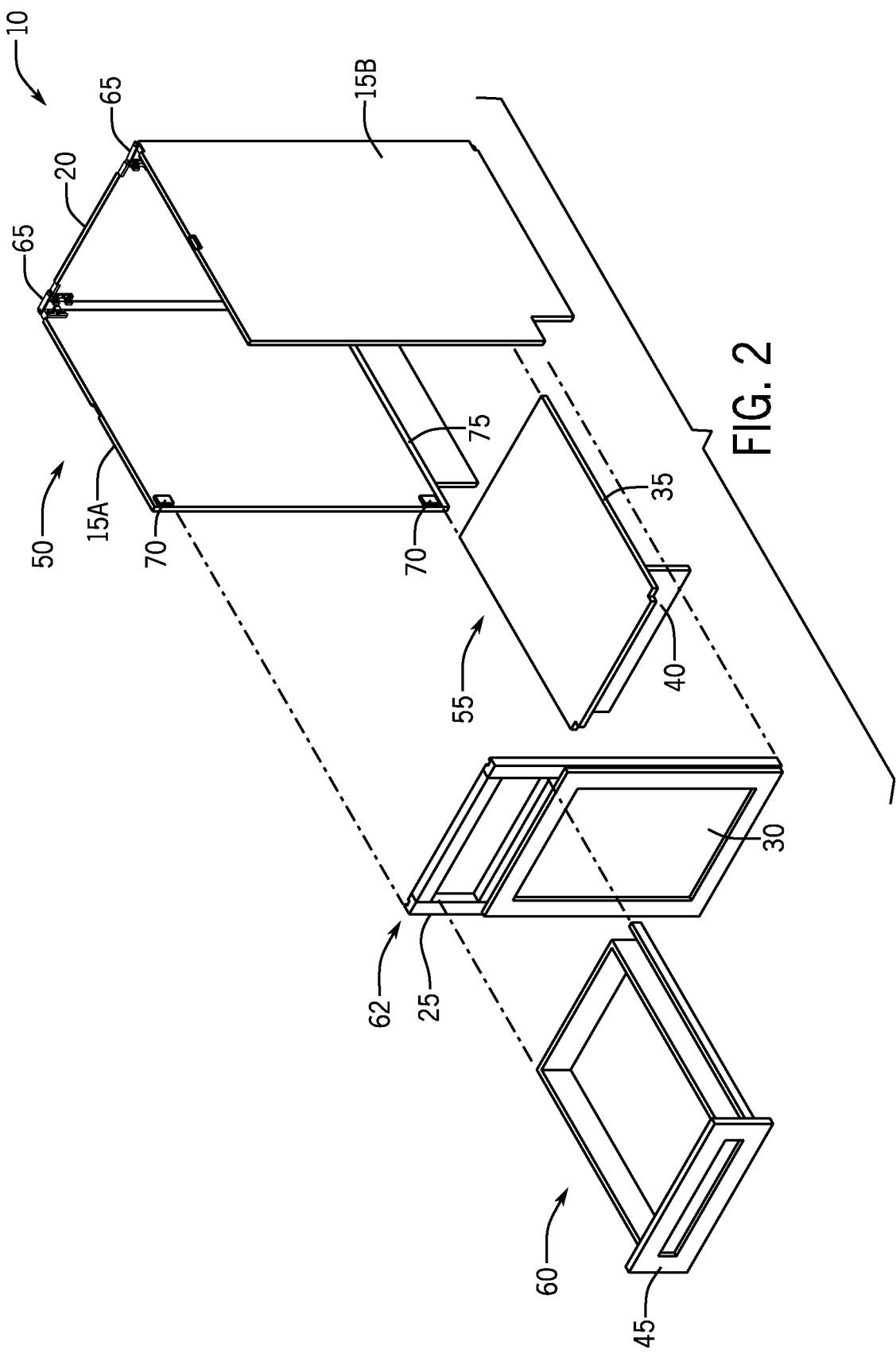
FIG. 2 shows an exploded view of the cabinet assembly of FIG. 1A, according to various embodiments.

FIG. 2 shows an exploded view of the cabinet assembly 10 of FIG. 1, according to various embodiments. The cabinet assembly 10 can be divided into different sub-assemblies.

For example, the two side panels 15A, 15B and the rear panel 20 can be pre-assembled (i.e., during manufacturing and prior to packaging) into a first sub-assembly 50. The bottom 35 and toe-kick 40 may be pre-assembled into a second sub-assembly 55. The drawer 45 may be a third sub-assembly 60. The face frame 25 and cabinet door 30 may be pre-assembled into a fourth sub-assembly 62.

The second sub-assembly 55, the third sub-assembly 60, and the fourth sub-assembly 62 may be optional, according to some embodiments. That is, in some embodiments, the drawer 45 may not be pre-assembled, the combination of the bottom 35 and toe-kick 40 may not be pre-assembled, the face frame 25 and the cabinet door 30 may not be pre-assembled, or a combination thereof. In such embodiments, additional assembly steps would be needed beyond those described herein to build the second sub-assembly 55, the third sub-assembly 60, and the fourth sub-assembly 62.

The second sub-assembly 55 including the bottom 35 and the toe-kick 40 pre-assembled is visible in FIG. 2. As shown in FIG. 2, the first sub-assembly 50 may be freestanding (e.g., able to stand on its own) when assembling the cabinet assembly 10 since the side panels 15A, 15B and the rear panel 20 are joined via the hinge assemblies 65.

As is also visible in FIG. 2, the side panels 15A, 15B can include brackets 70 on interior faces of the side panels 15A, 15B (and corresponding components on the face frame 25) for securing the face frame 25 and door 30 to the side panels 15A, 15B. The brackets 70 may be present at front upper and lower corners of the cabinet assembly 10. It is to be appreciated that the side panel 15B includes similar brackets 70. In some embodiments, the brackets 70 may not be included, and the face frame 25 and door 30 may be joined to the side panels 15A, 15B via fasteners such as screws or the like. In some embodiments, the brackets 70 may be secured to the face frame 25 and the side panels 15A, 15B prior to packaging of the cabinet assembly 10 to reduce an effort in assembling the cabinet assembly 10.

In the illustrated embodiment, the side panels 15A, 15B include a slot 75 formed in the interior face of the side panels 15A, 15B for guiding the bottom 35 into place in the cabinet assembly 10. In some embodiments, the slot 75 and the securement of the face frame 25 to the side panels 15A, 15B may retain the bottom 35 and toe-kick 40 in an assembled configuration. In some embodiments, additional fasteners (e.g., screws or the like) could be used to further secure the bottom 35 and toe-kick 40 in the assembled state.

Figure 3A:
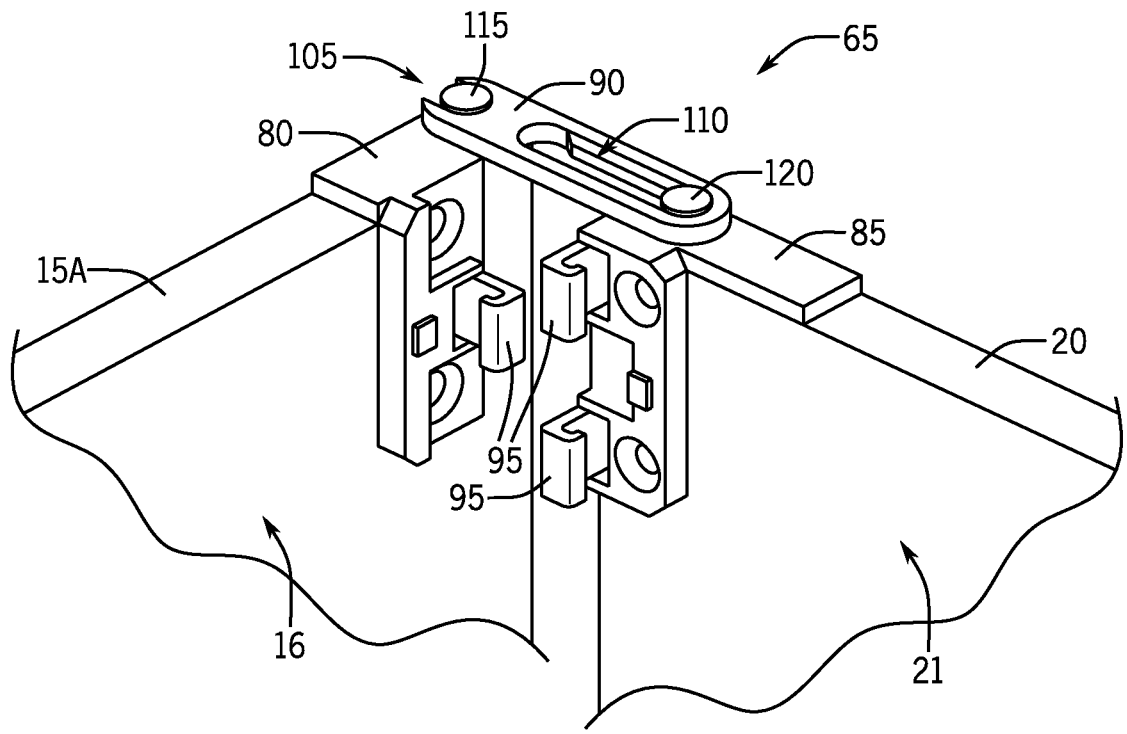
FIGS. 3A-3C are perspective views of a hinge assembly from the cabinet assembly of FIG. 1A in varying configurations, according to various embodiments.

FIG. 3A shows a perspective view of the hinge assembly 65, according to various embodiments. The hinge assembly 65 includes a first bracket 80 and a second bracket 85 linked together via a linkage 90. The linkage 90 enables the first bracket 80 and the second bracket 85 to move relative to each other, which in turn enables the side panels 15A, 15B and the rear panel 20 to be rotated from a folded configuration (e.g., a shipping configuration) into an assembled configuration, as shown and described in additional detail in accordance with FIGS. 5A-5F below.

The first bracket 80 is secured (e.g., via screws or the like) to the interior face 16 of the side panel 15A and includes one or more keys 95. The second bracket 85 is secured (e.g., via screws or the like) to the interior face 21 of the rear panel 20 and likewise includes one or more keys 95 positioned in an alternating configuration relative to the positioning of the key(s) 95 of the first bracket 80. Although the illustrated embodiment shows a single key 95 in the first bracket 80 and two keys 95 in the second bracket 85, it should be appreciated that the first bracket 80 and the second bracket 85 could include different numbers of keys 95.

The keys 95 generally have a hook-shape such that a locking bracket (FIG. 3C) can engage with the keys 95 to maintain the hinge assembly 65 in a locked state.

The linkage 90 includes a first aperture 105 that is generally round. As used herein, generally round means round subject to manufacturing tolerances or the like. The linkage 90 also includes a second aperture 110 that is generally oblong in shape. As used herein, generally oblong means oblong subject to manufacturing tolerances or the like. The linkage 90 can accordingly rotate around a pivot head 115 in the first bracket 80, with the pivot head 115 serving as the rotational axis for the linkage 90 about the first bracket 80. In some embodiments, the pivot head 115 extends from the first bracket 80 and is formed of a single piece, unitary construction with the first bracket 80. In some embodiments, the pivot head 115 can be part of a separate piece, such as a pin, that is inserted into an aperture formed in the first bracket 80. The linkage 90 can also be moved laterally relative to a pivot head 120 in the second bracket 85 such that the pivot head 120 serves as a second rotational axis for the linkage 90 about the second bracket 85. In some embodiments, the pivot head 120 extends from the second bracket 85 and is formed of a single piece, unitary construction with the second bracket 85. In some embodiments, the pivot head 120 can be part of a separate piece, such as a pin, that is inserted into an aperture formed in the second bracket 85.

In some embodiments, the pivot heads 115 and 120 are parts of separate pieces from the first bracket 80 and the second bracket 85, such as pins. In such embodiments, the bores 67 (FIG. 1C) may be present and the pins associated with the pivot heads 115 and 120 may be received in the bores 67 (FIG. 1C) of the side panel 15A and rear panel 20. Because of the generally oblong shape, the side panel 15A can also be moved relatively closer or farther from the rear panel 20. The combination of the apertures 105, 110 and the linkage 90 with pivot heads 115, 120 can thus enable the side panel 15A to be rotated relative to the rear panel 20 from a folded configuration (see FIG. 5A below) to an assembled configuration. The folded configuration may also be referred to as the packaged configuration, shipping configuration, or the like.

The first bracket 80 and the second bracket 85 include a protrusion 99. The protrusion 99 is illustrated as being at about a middle distance of the length of the brackets 80, 85. It is to be appreciated that the protrusion 99 can be moved along the length of the first bracket 80 or the second bracket 85.

In the illustrated embodiment, the hinge assembly 65 is installed on a top surface of the side panel 15A and the rear panel 20. As shown and described in accordance with FIGS. 1A-1C above, the side panel 15A and the rear panel 20 can include cutouts 69 proximate the rear edges of the side panel 15A and the rear panel 20 that enable the hinge assembly 65 to be disposed flush with the top surface of the side panel 15A and the rear panel 20. That is, the cutouts 69 serve as a countersink for the hinge assembly 65. In some embodiments, this can enable the surface of the cabinet assembly 10 to be flat for installation of a countertop or the like.

Figure 3B:
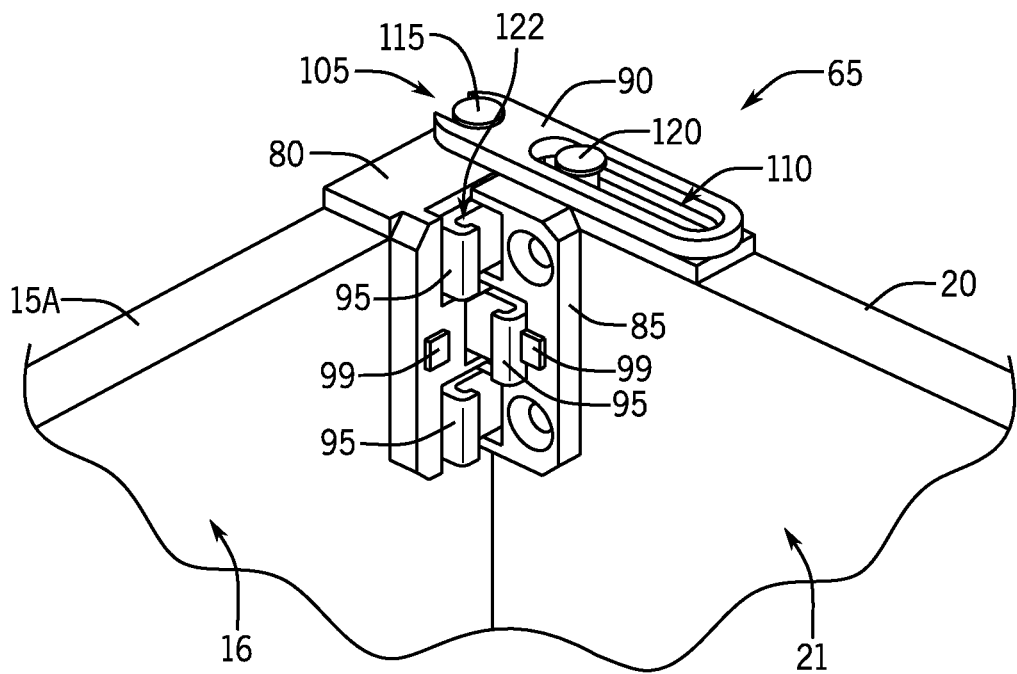

FIG. 3B shows a perspective view of the hinge assembly 65 in an assembled and unlocked state, according to various embodiments. In the assembled and unlocked state of FIG. 3B, the plurality of spaced keys 95 of the first bracket 80 and the key 95 of the second bracket 85 are alternatingly arranged forming a channel 122 therebetween.

Figure 3C:
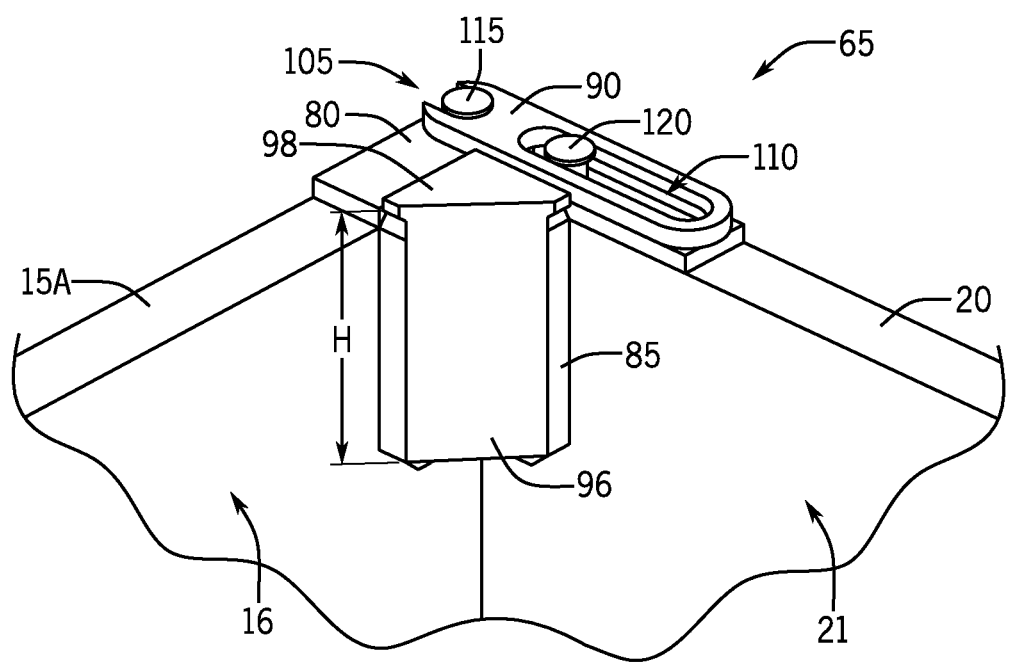

FIG. 3C shows a perspective view of the hinge assembly 65 in an assembled and locked state, according to various embodiments. In the assembled and locked state of FIG. 3C, a locking bracket 96 is securely inserted into the channel 122 (FIG. 3B).

The locking bracket 96 has a height H that generally extends from an upper flange 98 of the locking bracket 96. The height H corresponds to a dimension of the key channel 122 (FIG. 3B). In some embodiments, H is greater than a length of the key channel 122. In some embodiments, H can be selected based on a size of the first bracket 80 and the second bracket 85.

Figure 3D:
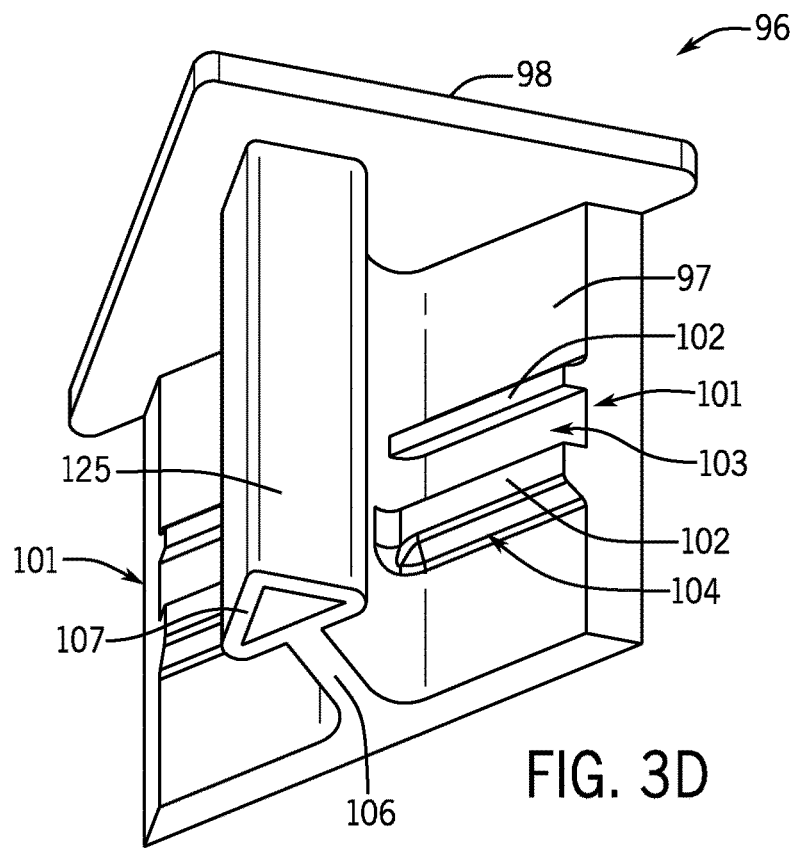
FIG. 3D is a perspective view of a locking bracket, according to various embodiments.

FIG. 3D shows a perspective view of the locking bracket 96, according to various embodiments. In the illustrated embodiment, the locking bracket 96 includes a locking member 125 and detents 101 on adjacent sides of the locking member 125. It is to be appreciated that some embodiments can include a detent 101 on one side of the locking member 125, but not the other. In some embodiments, more than one detent 101 could be included on a side of the locking member 125. The locking member 125 extends from an outer edge 97 of the locking bracket 96. The locking member 125 includes a first member 106 extending from the outer edge 97 and a second member 107. The second member 107 can have a substantially triangular prism-shaped geometry. Substantially triangular prism-shaped, as used herein, includes triangular prism-shaped subject to manufacturing tolerances or the like. It is to be appreciated that the geometry is an example and can vary so long as the locking member 125 is insertable into the channel 122 (FIG. 3B). The first member 106 is sized to be able to be insertable between ends of the keys 95 so that the second member 107 is disposed within the channel 122.

The detents 101 are configured to interface with protrusions 99 (FIG. 3B) from the first bracket 80 (FIG. 3B) and the second bracket 85 (FIG. 3B). The detents 101 can secure the hinge assembly 65 in the locked state when the locking bracket 96 is installed by interfacing with the protrusions 99. In some embodiments, the detents 101 and the protrusions 99 can provide a state in which the cabinet assembly 10 is difficult to disassemble to, for example, prevent accidental disassembly. Each detent 101 generally includes two protrusions 102 spaced apart a distance corresponding to a size of the protrusions 99, forming a cavity 103 to receive the protrusions 99. The protrusions 102 extend from an outer edge 97 of the locking bracket 96. The protrusions 102 may have a ramped surface 104 to facilitate installation of the locking bracket 96 to the hinge assembly 65. For example, the ramped surface 104 can allow for the protrusion 102 to more easily slide past the protrusions 99 during installation of the locking bracket 96.

Figure 3E:
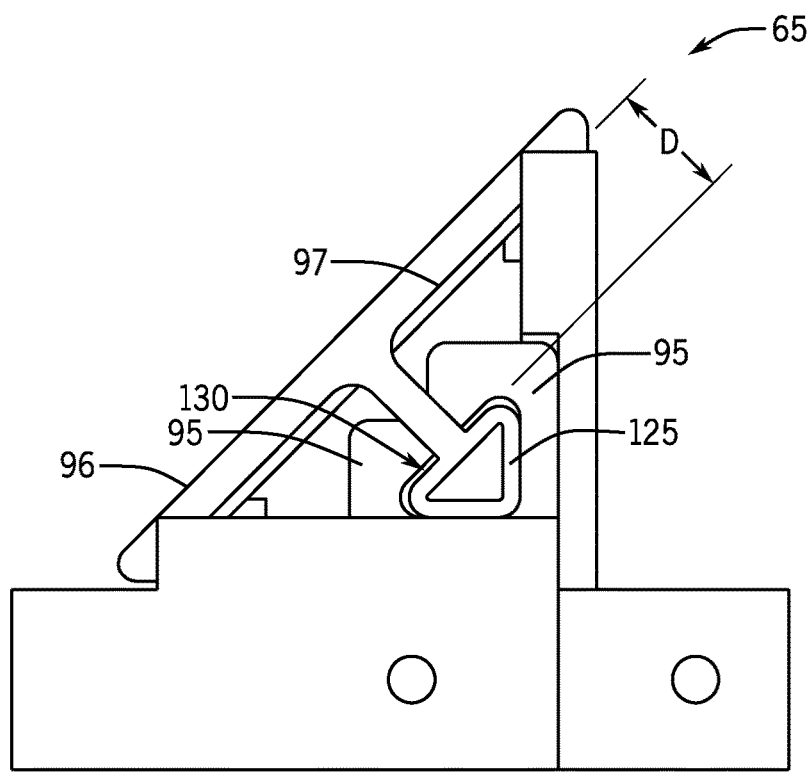
FIG. 3E is an end view of a hinge assembly and locking bracket from the cabinet assembly of FIGS. 1A-1C, according to various embodiments.

FIG. 3E shows a bottom end view of the locking bracket 96 assembled with the hinge assembly 65, according to various embodiments. The locking bracket 96 includes a locking member 125 positioned relatively away from an outer edge 97 of the locking bracket 96. The locking member 125 is configured so that the extension distance D is selected based on a size of the channels formed by the alternatingly arranged keys 95 of the hinge assembly 65. Accordingly, when installed to the hinge assembly 65, a surface 130 of the locking member engages the keys 95.

Figure 4A:
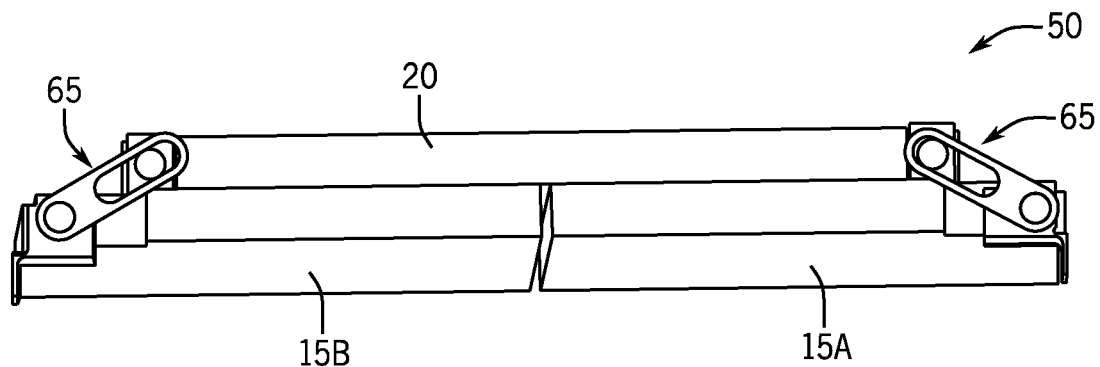
FIGS. 4A-4C show examples of folded configurations for a cabinet sub-assembly, according to various embodiments.
Figure 4B:
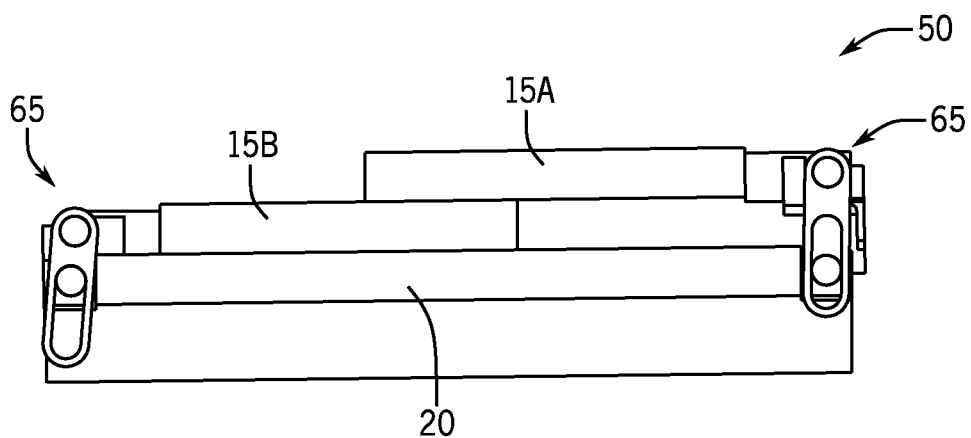
Figure 4C:
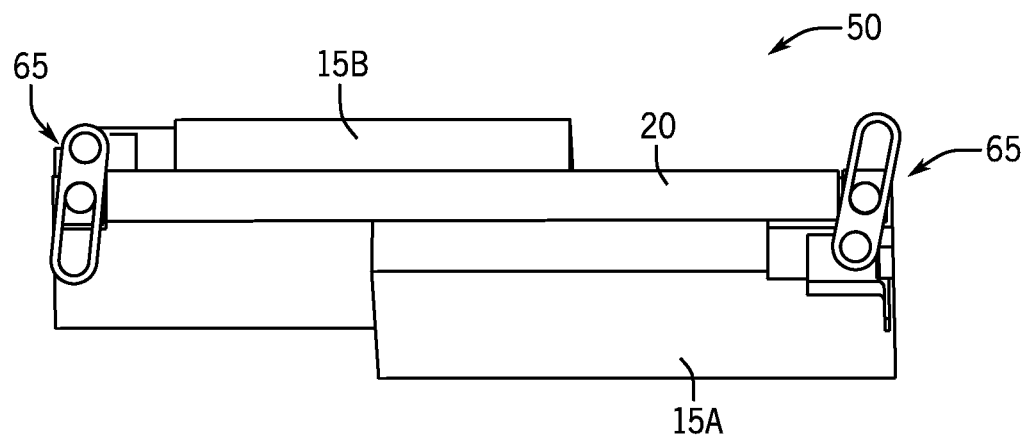

FIGS. 4A-4C show examples of folded configurations for the sub-assembly 50, according to various embodiments. The sub-assembly 50, including the side panels 15A, 15B, the rear panel 20, and the hinge assemblies 65, can be folded into various configurations because of the hinge assemblies 65. FIG. 4A shows a folded configuration in which both side panels 15A, 15B are folded to a front side of the rear panel 20. FIG. 4B shows a folded configuration in which both side panels 15A, 15B are folded to a back side of the rear panel 20. FIG. 4C shows a folded configuration in which side panel 15A is folded to the front side of the rear panel 20 and the side panel 15B is folded to the back side of the rear panel 20. The embodiment illustrated in FIG. 4C can be referred to as a staggered formation or a "Z-formation." In some embodiments, the folded configuration may depend on a size of the side panels 15A, 15B relative to the rear panel 20. For example, if the side panels 15A, 15B are wider than the rear panel 20, then the folded configurations of FIGS. 4A and 4B may not be possible. The hinge assemblies 65 enable unfolding to assemble the cabinet assembly 10, and because of the configuration of the hinge assemblies 65, it may be possible to prevent misalignment of the side panels 15A, 15B and the rear panel 20 when assembling the cabinet assembly 10.

FIGS. 5A-5F show pictorial depictions of various states in a method of assembling the cabinet assembly 10 of FIGS. 1A, 1B, according to various embodiments.

Figure 5A:
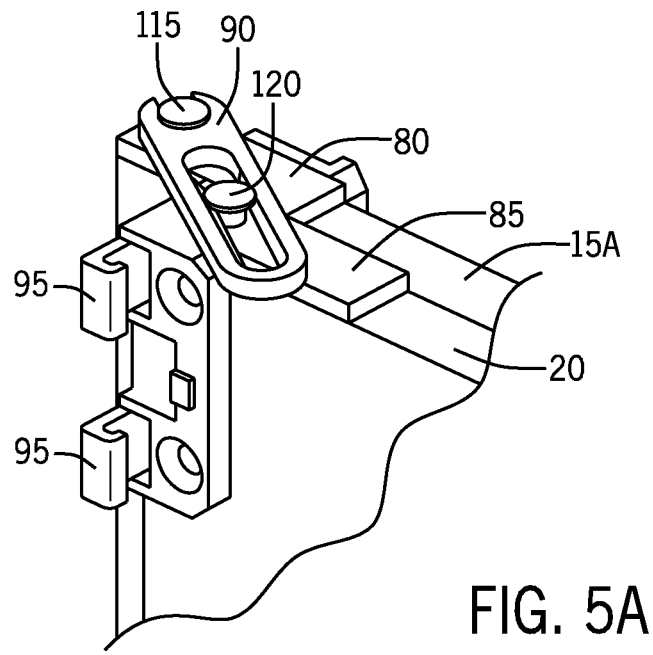
FIGS. 5A-5F show pictorial depictions of various states in a method of assembling the cabinet assembly of FIGS. 1A-1C, according to various embodiments.

FIG. 5A shows a perspective view of the hinge assembly 65 in the folded configuration, according to various embodiments. In the folded configuration, the side panel 15A and the rear panel 20 are stacked such that they lay flat against each other in a parallel orientation. The folded configuration is representative of a configuration in which the side panel 15A and the rear panel 20 are removed from a package in which the cabinet assembly 10 is sold. Similarly, the side panel 15B could likewise be folded over, either behind the other side panel 15A or in front of the rear panel 20 as shown and described in accordance with FIGS. 4A-4C above.

Figure 5B:
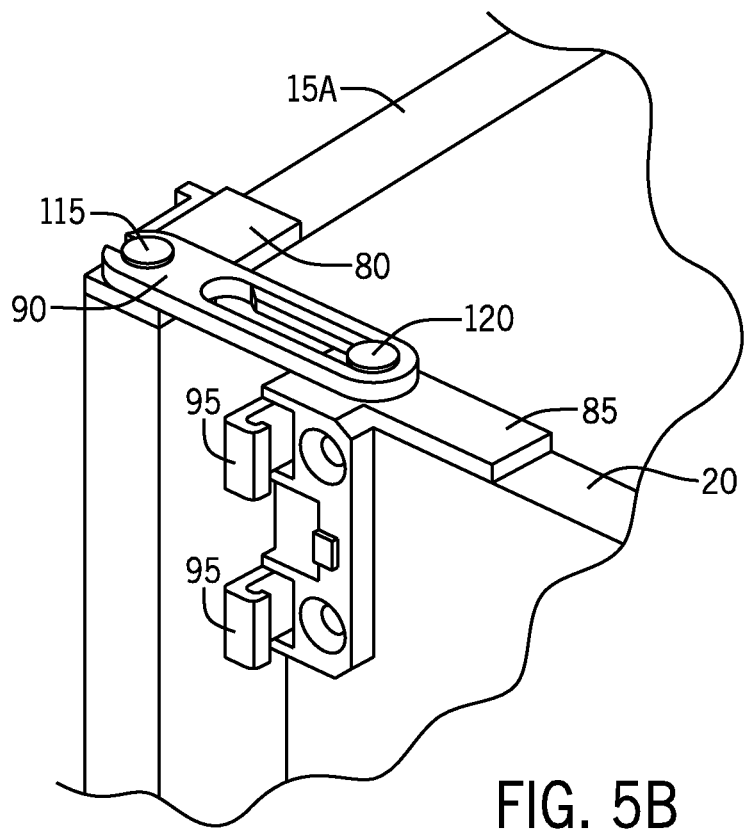

FIG. 5B shows a perspective view of the hinge assembly 65 in a first rotational state, according to various embodiments. In the first rotational state, the side panel 15A has been rotated in a counterclockwise direction by about 90°. It is to be appreciated that the rotational state can include a different amount of rotation and that the first rotational state is an example.

Figure 5C:
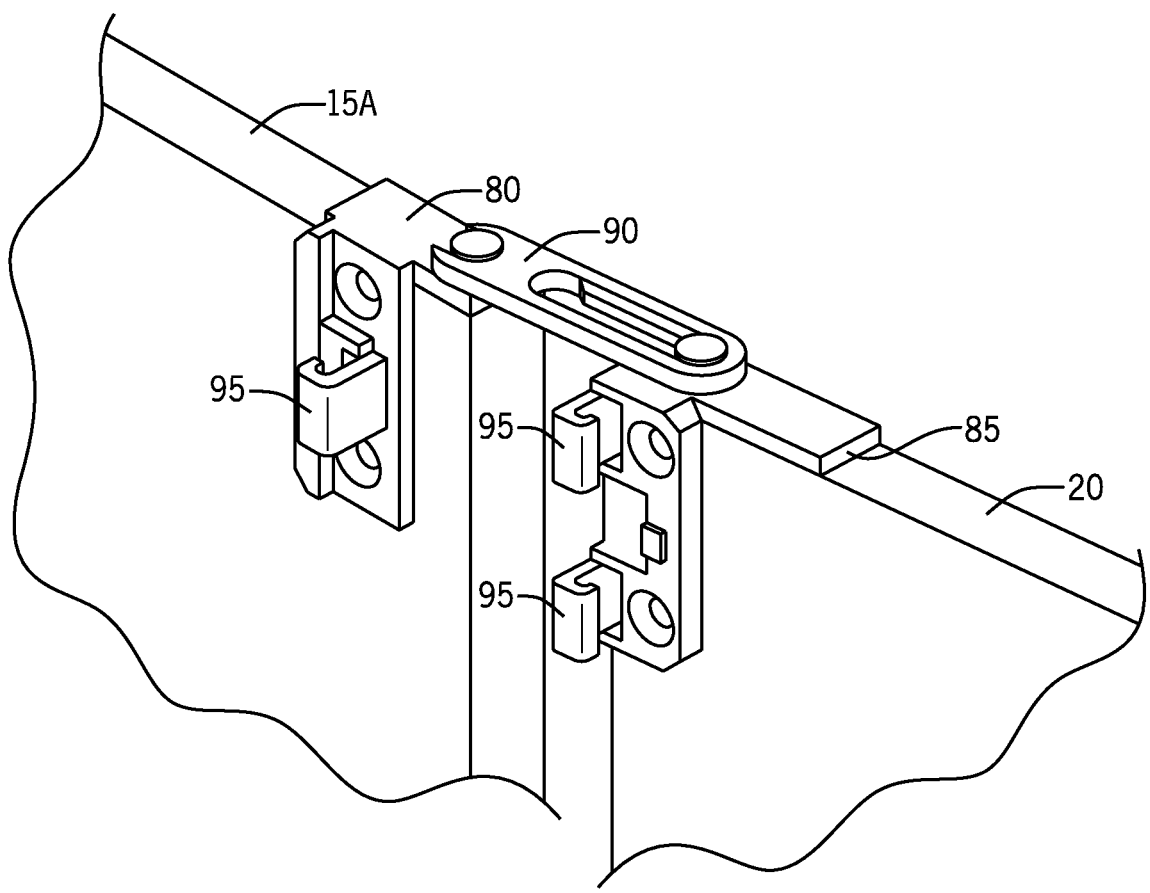

FIG. 5C shows a perspective view of the hinge assembly 65 in a second rotational state, according to various embodiments. In the second rotational state, the side panel 15A has been rotated in a counterclockwise direction by about 180°. It is to be appreciated that the rotational state can include a different amount of rotation and that the second rotational state is an example.

Figure 5D:
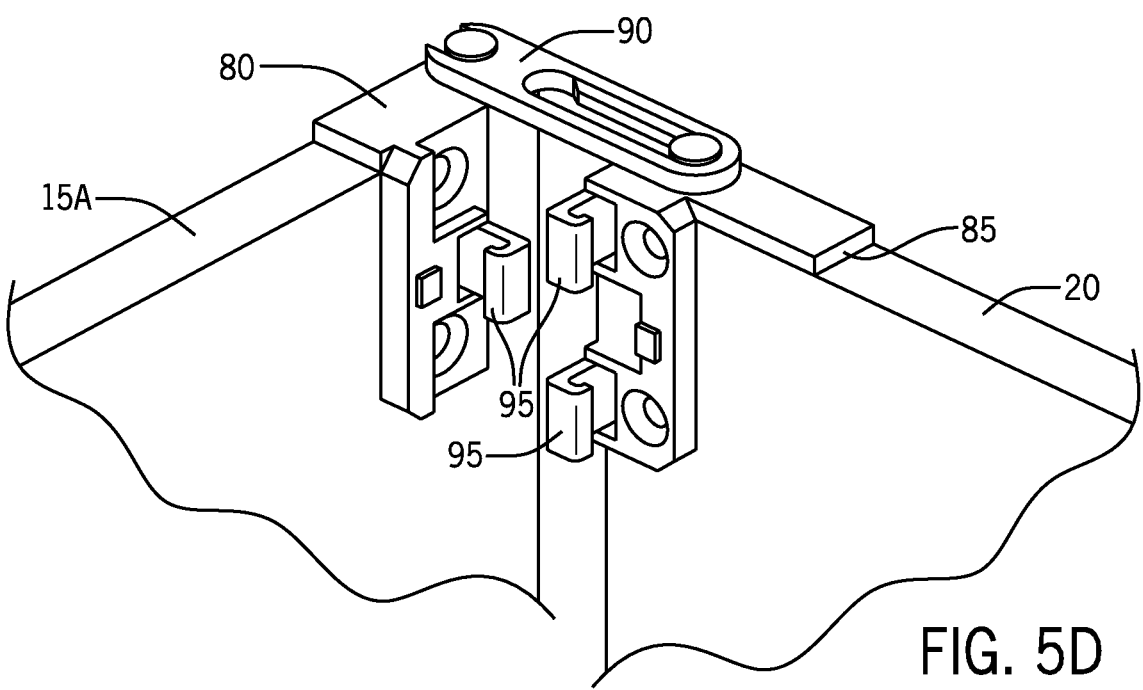

FIG. 5D shows a perspective view of the hinge assembly 65 in a third rotational state, according to various embodiments. In the third rotational state, the side panel 15A has been rotated in a counterclockwise direction by about 270°. It is to be appreciated that the rotational state can include a different amount of rotation and that the third rotational state is an example. In the third rotational state, the side panel 15A and the rear panel 20 are generally perpendicular to each other such that the side panel 15A and the rear panel 20 are approaching a locking state.

Figure 5E:
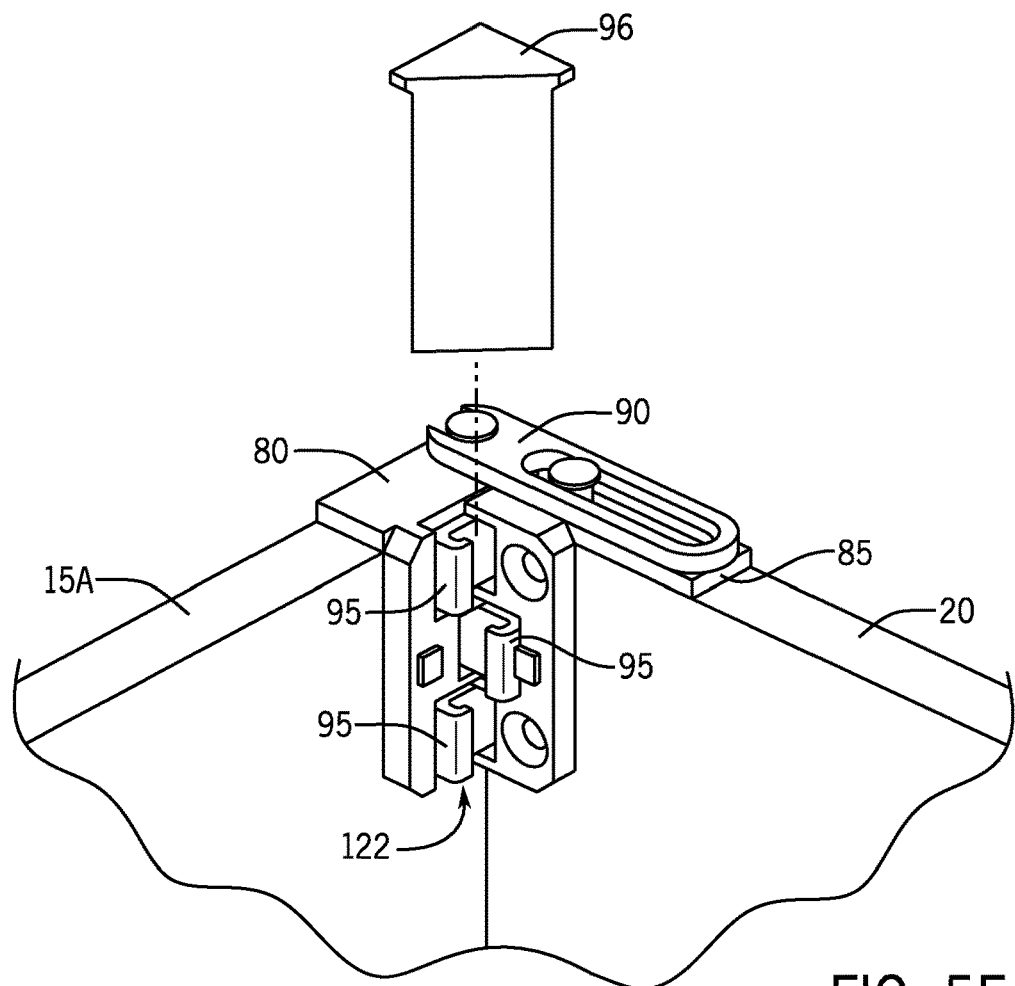

FIG. 5E shows a perspective view of the hinge assembly 65 in an assembled and unlocked state, according to various embodiments. In the assembled and unlocked state, the hinge assembly 65 is ready to be locked in place, and accordingly, the side panel 15A and the rear panel 20 are arranged perpendicular to each other and adjacent to each other such that the locking bracket 96 can be installed.

Figure 5F:
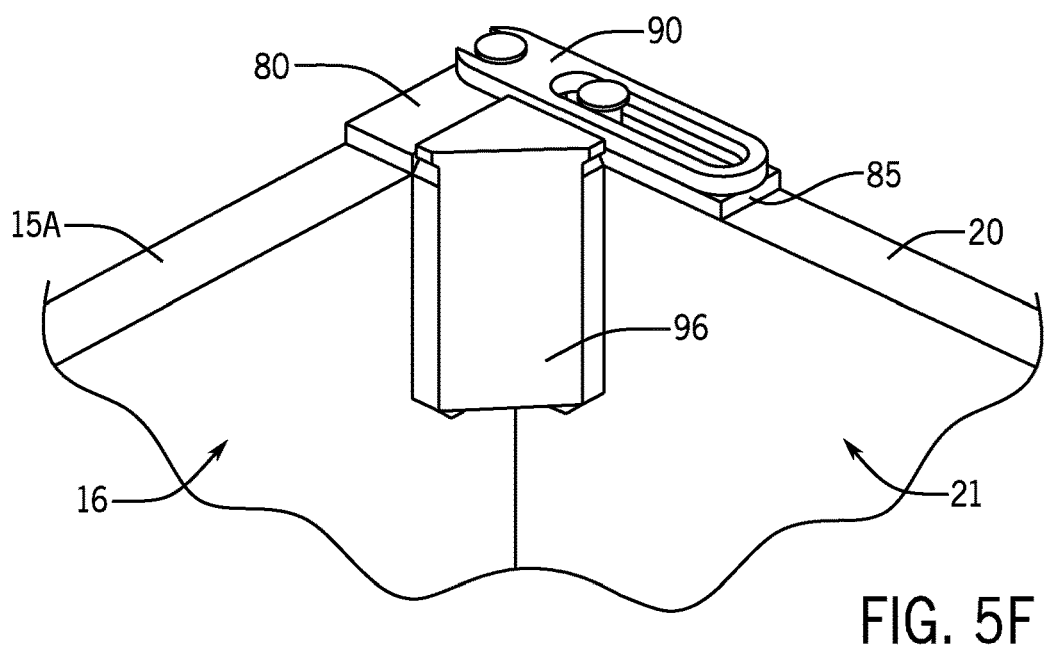

FIG. 5F shows a perspective view of the hinge assembly 65 in an assembled and locked state, according to various embodiments. In the illustrated embodiment, the locking bracket 96 is secured into place on the hinge assembly 65. As a result, the side panel 15A and the rear panel 20 are secured together.

The above description is relative to the side panel 15A and the rear panel 20. For simplicity of this Specification, the side panel 15B and the rear panel 20 are assembled in the same manner, but, in some embodiments, mirrored relative to each other such that the side panel 15B is rotated in a clockwise direction. In other embodiments, the side panel 15B may be positioned along the opposite side of the rear panel 20 from the other side panel 15A when in the folded position.

Figure 6:
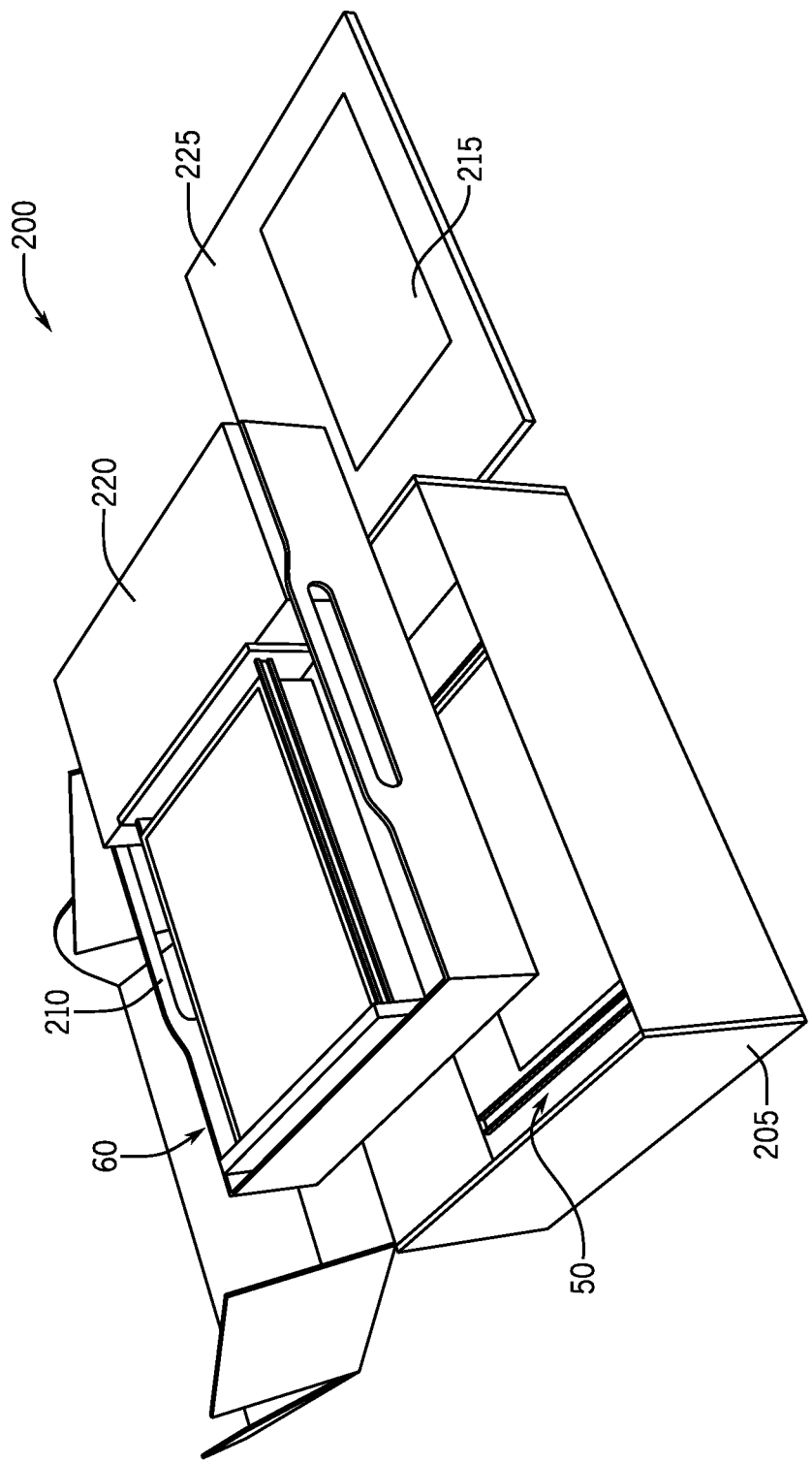
FIG. 6 shows a cabinet assembly kit, according to various embodiments.

FIG. 6 shows a cabinet assembly kit 200, according to various embodiments. The cabinet assembly kit 200 is generally representative of the packaging in which the cabinet assembly 10 may be sold. The cabinet assembly kit 200 therefore includes the cabinet assembly 10 of FIG. 1.

In the cabinet assembly kit 200, a first section 205 includes the sub-assembly 50 and a second section 210 includes the other sub-assemblies 55, 60, and 62, as well as hardware for locking the components during assembly. It is to be appreciated that an instruction manual 215 can be included. The kit 200 can be divided differently or may include just a single section with all components included therein. In the illustrated embodiment, the section 210 may be inserted into the section 205. In some embodiments, the section 205 may be sealed (e.g., taped or the like) to contain the cabinet assembly kit 200. In the illustrated embodiment, additional packing materials 220, 225 can be included in the cabinet assembly kit 200 to reduce shifting of the cabinet assembly 10, reduce a likelihood of damaging the cabinet assembly 10, or the like.

Figure 7:
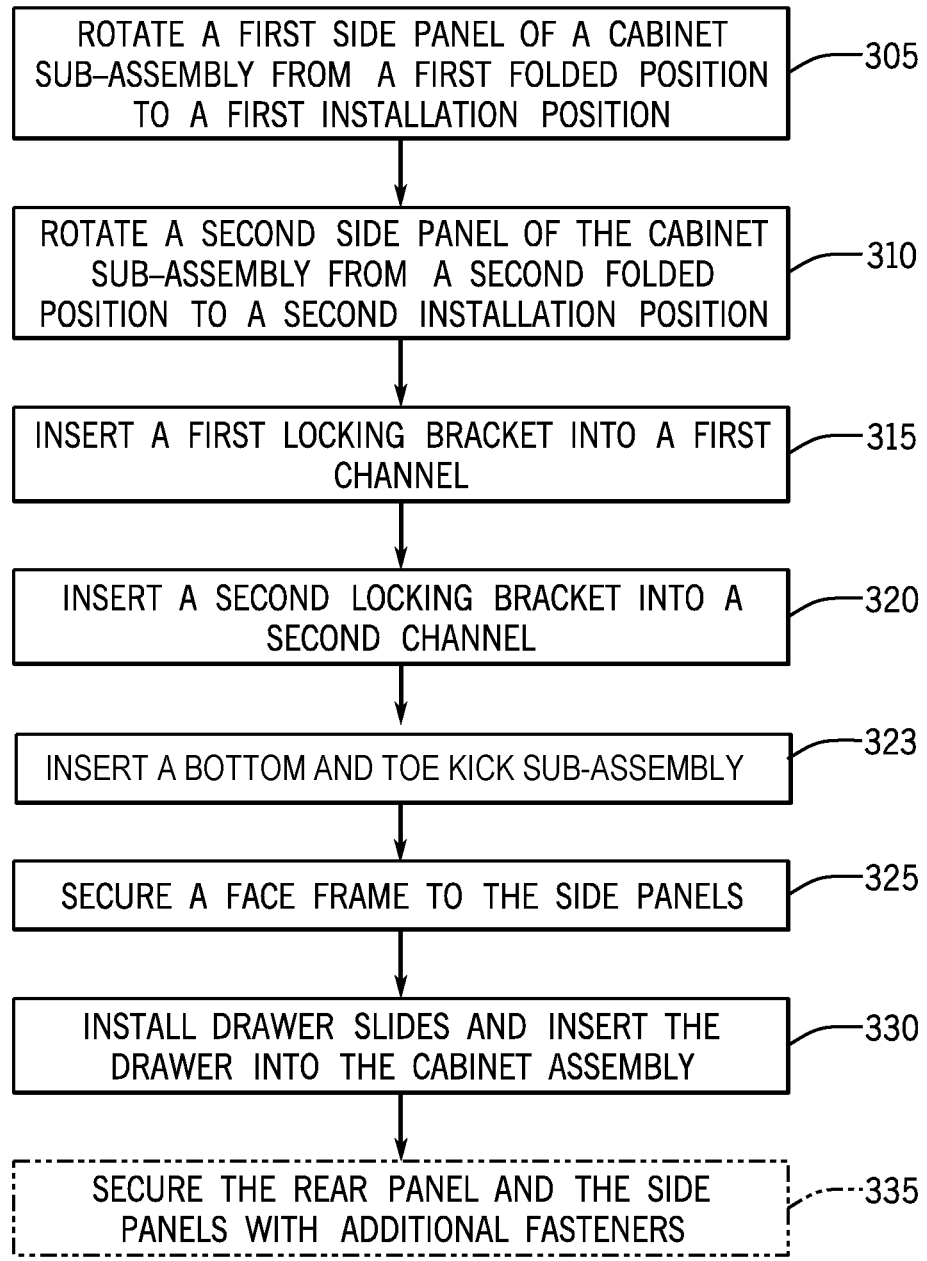
FIG. 7 shows a flowchart for a method of assembling the cabinet assembly of FIGS. 1A-1C, according to various embodiments.

FIG. 7 is a flowchart of a method 300 for assembling the cabinet assembly 10 (FIG. 1), according to various embodiments. At block 305, a first side panel (e.g., side panel 15A) of a cabinet sub-assembly (e.g., first sub-assembly 50) is rotated from a first folded position to a first installation position. At block 310, a second side panel (e.g., side panel 15B) is rotated from a second folded position to a second installation position. At block 315, a first locking bracket (e.g., locking bracket 96) is inserted into a first channel (e.g., channel 122) formed by a hinge assembly (e.g., the hinge assembly 65). At block 320, a second locking bracket 96 is inserted into the second channel 122 formed by a second hinge assembly 65. The sub-assembly 50 may be in the assembled configuration after block 320. In some embodiments, third and fourth locking brackets are inserted into third and fourth hinge assemblies 65 after block 320.

At block 323, a bottom (e.g., the bottom 35) and toe-kick (e.g., the toe-kick 40) as a sub-assembly (e.g., sub-assembly 55) may be inserted to the first sub-assembly 50 by inserting the sub-assembly 55 into a slot (e.g., slot 75) in the side panels 15A and 15B. At block 325, a face frame (e.g., face frame 25) is secured to the side panels 15A, 15B. The face frame 25 may be secured to the side panels 15A, 15B at block 325 via bracket assemblies (e.g., bracket assemblies 70) in four corners at which the face frame 25 and the side panels 15A, 15B meet.

At block 330, drawer slides may be installed on the side panels 15A, 15B, and then a drawer (e.g., the drawer 45) inserted into the cabinet assembly 10. In some embodiments, the method 300 can may include securing the side panels 15A, 15B to the rear panel 20 by, for example, screwing the side panels 15A, 15B to the rear panel 20 (block 335). The fastening (block 335) is optional because the cabinet assembly 10 is securely assembled without the screws or other fasteners. In some embodiments, the screws may provide additional security to prevent unintentional disassembly of the cabinet assembly 10.

Thus, embodiments provide for a cabinet assembly 10 that is formed from pre-assembled sub-assemblies according to a simplified assembly process. The sub-assemblies, especially the first sub-assembly 50, can enable a single individual to more easily assemble the cabinet assembly since the hinge assemblies 65 reduce a difficulty in aligning the side panels 15A, 15B and the rear panel 20. Additionally, the pre-assembled sub-assemblies can help reduce, or prevent altogether, misalignment or misplacement of the cabinet components when assembling the cabinet assembly. Further, the foldable cabinets disclosed herein permit more compact packaging and therefore involve lower shipping costs.

The terminology used herein is intended to describe embodiments and is not intended to be limiting. The terms "a," "an," and "the" include the plural forms as well, unless clearly indicated otherwise. The terms "comprises" and/or "comprising," when used in this Specification, specify the presence of the stated features, integers, steps, operations, elements, and/or components, but do not preclude the presence or addition of one or more other features, integers, steps, operations, elements, and/or components.

It is to be understood that changes may be made in detail, especially in matters of the construction materials employed and the shape, size, and arrangement of parts without departing from the scope of the present disclosure. This Specification and the embodiments described are examples, with the true scope and spirit of the disclosure being indicated by the claims that follow.

What is claimed is:

1. A hinge assembly, comprising:
a first bracket having a first key and a first pivot head;
a second bracket having a second key and a second pivot head;
wherein the first key alternates with the second key to create a key channel when the first bracket is positioned at a generally right angle relative to the second bracket; and
a linkage having a first generally round aperture and a second generally oblong aperture,
wherein the first pivot head is positioned within the first aperture to thereby couple the linkage and the first bracket,
wherein the second pivot head is positioned within the second aperture to thereby couple the linkage and the second bracket;
wherein the second pivot head is movable laterally within the second aperture, and
a locking bracket having an outer edge and a locking member extending away from the outer edge,
the locking member sized and shaped to be inserted into the key channel,
wherein the locking bracket locks the first bracket into a substantially right angle relative to the second bracket when the locking member is inserted into the key channel.

2. The hinge assembly of claim 1, wherein one or more of:
the first pivot head is an integrally formed part of the first bracket; and
the second pivot head is an integrally formed part of the second bracket.

3. The hinge assembly of claim 1, wherein the first bracket includes a protrusion and the locking bracket includes a detent having a cavity configured to receive the protrusion, and wherein when the locking bracket locks the first bracket into a substantially right angle relative to the second bracket when the locking member is inserted into the key channel, the protrusion is received in the cavity.

4. The hinge assembly of claim 3, wherein the detent comprises a plurality of protrusions spaced apart a distance corresponding to a size of the protrusion of the first bracket.

5. The hinge assembly of claim 4, wherein a first of the plurality of protrusions includes a ramped surface.

6. The hinge assembly of claim 1, wherein the second bracket includes a protrusion and the locking bracket includes a detent having a cavity configured to receive the second protrusion, and wherein when the locking bracket locks the second bracket into a substantially right angle relative to the first bracket when the locking member is inserted into the key channel, the protrusion is received in the cavity.

7. The hinge assembly of claim 6, wherein the detent comprises a plurality of protrusions spaced apart a distance corresponding to a size of the protrusion of the second bracket.

8. The hinge assembly of claim 7, wherein a first of the plurality of protrusions includes a ramped surface.

9. The hinge assembly of claim 1, wherein the locking member has a substantially triangular prism-shaped geometry.

10. A method, comprising:
rotating a first bracket of a hinge assembly and a second bracket of the hinge assembly into a locking position,
wherein the first bracket has a first key and a first pivot head;
wherein the second bracket has a second key and a second pivot head;
wherein the locking position is selected so that the first bracket and the second bracket are arranged perpendicularly to each other, wherein the hinge assembly defines a channel when first bracket and the second bracket are in the locking position;
wherein the first key alternates with the second key to form the channel;
wherein a linkage has a first generally round aperture and a second generally oblong aperture;
wherein the first pivot head is positioned within the first aperture to thereby couple the linkage and the first bracket;
wherein the second pivot head is movable laterally within the second aperture; and
inserting a locking bracket into the channel,
wherein the locking bracket locks the first bracket and the second bracket of the hinge assembly into a substantially right angle relative to each other when the locking bracket is inserted into the first channel.

11. The method of claim 10, wherein the first bracket includes a protrusion and the locking bracket includes a detent having a cavity, and wherein inserting the locking bracket into the channel includes inserting the protrusion into the cavity.

12. A kit, comprising:
a hinge assembly, comprising:
a first bracket having a first key and a first pivot head;
a second bracket having a second key and a second pivot head;
wherein the first key alternates with the second key to create a key channel when the first bracket is positioned at a generally right angle relative to the second bracket; and
a linkage having a first generally round aperture and a second generally oblong aperture,
wherein the first pivot head is positioned within the first aperture to thereby couple the linkage and the first bracket,
wherein the second pivot head is positioned within the second aperture to thereby couple the linkage and the second bracket;
wherein the second pivot head is movable laterally within the second aperture, and
a locking bracket having an outer edge and a locking member extending away from the outer edge,
the locking member sized and shaped to be inserted into the key channel,
wherein the locking bracket locks the first bracket into a substantially right angle relative to the second bracket when the locking member is inserted into the key channel.

13. The kit of claim 12, wherein one or more of:
the first pivot head is an integrally formed part of the first bracket; and
the second pivot head is an integrally formed part of the second bracket.

14. The kit of claim 12, wherein the first bracket includes a protrusion and the locking bracket includes a detent having a cavity configured to receive the protrusion, and wherein when the locking bracket locks the first bracket into a substantially right angle relative to the second bracket when the locking member is inserted into the key channel, the protrusion is received in the cavity.

15. The kit of claim 14, wherein the detent comprises a plurality of protrusions spaced apart a distance corresponding to a size of the protrusion of the first bracket.

16. The kit of claim 15, wherein a first of the plurality of protrusions includes a ramped surface.

17. The kit of claim 16, wherein the second bracket includes a protrusion and the locking bracket includes a detent having a cavity configured to receive the second protrusion, and wherein when the locking bracket locks the second bracket into a substantially right angle relative to the first bracket when the locking member is inserted into the key channel, the protrusion is received in the cavity.

18. The kit of claim 17, wherein the detent comprises a plurality of protrusions spaced apart a distance corresponding to a size of the protrusion of the second bracket.

19. The kit of claim 18, wherein a first of the plurality of protrusions includes a ramped surface.

20. The kit of claim 12, wherein the locking member has a substantially triangular prism-shaped geometry.

* * * * *